United States Patent [19]
Kildishev et al.

[11] 3,733,505
[45] May 15, 1973

[54] INDUCTION TRANSDUCER OF THE EXCITATION CURRENT OF A SYNCHRONOUS GENERATOR

[76] Inventors: Vasily Semenovich Kildishev, Plekhanovskaya ulitsa, 41/43, kv. 55, Kharkov; Gely Alexeevich Kovalkov, Leningradsky prospekt, 26, kv. 174; Nikolai Sergeevich Maznikin, B. Pochtovaya ulitsa, 14/16, kv. 61; Alexandr Vasilievich Misjulin, Vyazemskaya ulitsa, 24, kv. 23, all of Moscow, U.S.S.R.

[22] Filed: Feb. 8, 1971

[21] Appl. No.: 113,290

[52] U.S. Cl.................310/112, 307/84, 310/68 R, 310/68 D, 322/59, 322/28
[51] Int. Cl.......................H02k 7/20, H02k 17/44
[58] Field of Search.................310/112-114, 162, 310/166, 168-170, 68 R, 68 D; 322/28, 59; 307/84

[56] References Cited
UNITED STATES PATENTS

| | | | |
|---|---|---|---|
| 3,401,328 | 9/1968 | Hartung | 322/28 |
| 3,227,941 | 1/1966 | Collamore | 310/68 R |
| 2,897,383 | 7/1959 | Barrows | 310/68 D |
| 3,445,697 | 5/1969 | Costa | 310/68 R |
| 429,736 | 6/1890 | Pfund | 310/68 D |

Primary Examiner—J. D. Miller
Assistant Examiner—Mark O. Budd
Attorney—Waters, Roditi, Schwartz & Nissen

[57] ABSTRACT

The present invention relates to an induction transducer of the excitation current of a synchronous generator.

An induction current transducer according to the invention is characterized in that its rotor uses a coupling interconnecting the shafts of a synchronous generator and an exciter and carrying the field winding of the transducer, which uses the conductors from the exciter to the synchronous generator, enclosed by a stator.

The current transducer is intended for use mainly on high-power turbo-alternators with brushless excitation.

3 Claims, 3 Drawing Figures

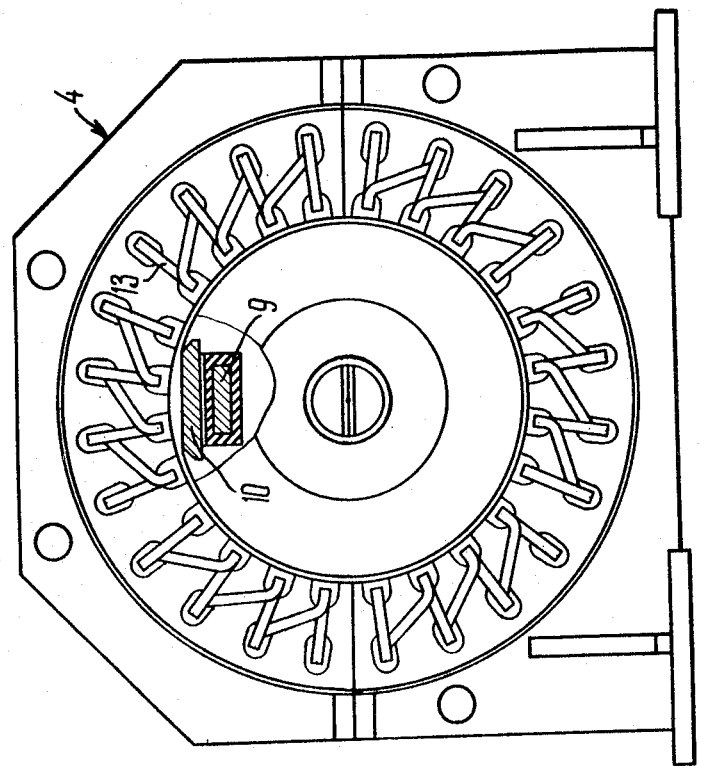
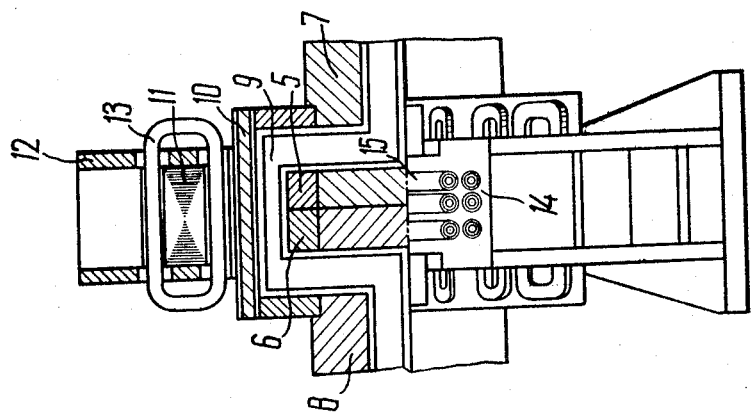
FIG. 3
FIG. 2

INDUCTION TRANSDUCER OF THE EXCITATION CURRENT OF A SYNCHRONOUS GENERATOR

The present invention relates to electrical machines, and more specifically to an induction transducer of the excitation current of a synchronous generator.

In the prior art, there is an induction transducer of the excitation current of a synchronous generator, connected to an exciter electrically and mechanically via a coupling and mounted on the shaft of the generator-exciter set. This transducer is made a separate synchronous machine comprising a stator and a rotor the field winding of which uses the current-conductors from the exciter to the generator (see, for example, USSR Inventor's Certificate No. 226005, Class 21d$^2$, 6/.1, 1967).

An induction current transducer made in the form of a separate machine requires an additional space for its installation, which increases the longitudinal size of the set and complicates the design of the conductors from the exciter to the generator into which the field winding of the induction current transducer is interposed.

An object of the present invention is to avoid these disadvantages.

A particular object of the invention is to provide an induction transducer of the excitation current of a synchronous generator, with which the axial size of the set is materially reduced, its reliablility is enhanced, and the design of the set as a whole is simplified.

With these objects in view, the invention resides in that in an induction current transducer according to the invention, the transducer rotor is the coupling interconnecting the shafts of a generator and an exciter and carrying the field winding of the transducer, enclosed by a stator.

For ease of access to the coupling, it is preferable to make an induction current transducer with a split rotor.

Besides, it is preferable that this stator should have a ring-type winding.

An induction current transducer, embodied in accordance with the present invention, does not require for its installation a separate place on the shaft of the set and, as a consequence, reduces the axial size of the set and is simple to make.

The induction current transducer disclosed herein may be made for any desired power, which makes unnecessary the use of any additional amplifying or converting devices.

The invention will be more fully understood from the following description of a preferred embodiment when read in connection with the accompanying drawings wherein:

FIG. 2 is a longitudinal section through the same induction current transducer.

FIG. 3 is a front view of an induction current transducer with a split stator.

Figure 1:
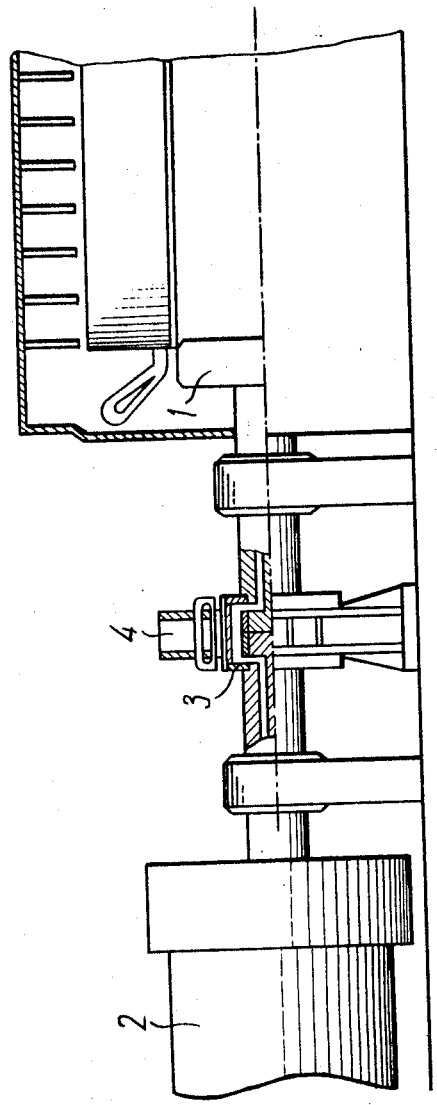
FIG. 1 is a longitudinal section through an induction current transducer, synchronous generator and exciter.

Referring to FIGS. 1 and 2, there is a synchronous generator 1 connected to its exciter 2 by a coupling 3 which is used as the rotor of an induction current transducer and around which the stator of this current transducer is arranged. The coupling 3 consists of two hubs 5 and 6 mounted on the ends of the shafts 7 and 8 of the generator 1 and the exciter 2, respectively.

Disposed on the diametrically opposite sides of the coupling 3 are current-conductors 9 (only one conductor 9 is shown in FIG. 3) for electrical connection of the exciter 2 to the generator 1, which also double as the field (rotor) winding of the induction current transducer.

When used as the rotor of an induction current transducer, the coupling should meet the following two requirements as regards its construction: (1) the conductors 9, which are also the conductors in the field winding of the induction current transducer, should be located on the perimeter of the coupling, and (2) they should be anchored in the slots of the coupling by non-magnetic wedges (in the case on hand, the conductors 9 are anchored by non-magnetic wedges 10).

The core 11 of the stator 4 is built up of electrical-sheet steel punchings clamped together between two non-magnetic end-plates 12 which also serve as parts of the frame of the current transducer.

For ease of access to the coupling 3 during the installation, alignment and servicing of the generator and exciter, the stator 4 (FIG. 3) of the induction current transducer is split in a horizontal plane.

The split stator and the two-pole magnetic circuit (the two conductors in the rotor of the current transducer) in turn determined the type of winding for the stator of the induction current transducer.

The winding of the stator 4 is of the three-phase ring type. Each phase of the winding is made up of $n$ coils 13, and each part of the split stator carries $n/2$ coils 13.

The start and finish of each half of a phase coil are brought out to a terminal board 14, composed of two split parts. In the assembled stator, the parts of the stator winding are connected together by means of straps 15 on the terminal board 14.

With the stator built as described above, it is split at the inter-coil connections, that is, across the minimum number of conductors, which enhances the reliability of the induction current transducer. Besides, this winding is easy and simple to place in its slots.

It should be noted that the use of split stators in order to simplify their installation and handling has been known in the prior art. In this particular case, however, a split stator serves a different purpose, that of ensuring easy access to the coupling for servicing.

The induction current transducer disclosed herein operates as follows.

In flowing from the armature of the exciter 2 to the rotor of the generator 1 over the conductors 9, the excitation current sets up in the coupling 3 a magnetic flux determined by the magnitude of that current. This magnetic flux has its path completed through the space surrounding the coupling 3 and containing the stator 4. When the coupling is rotated at a constant speed, an e.m.f. is induced in the winding of the stator 4, proportional to the said magnetic flux, that is, to the excitation current. The magnitude of this e.m.f., or the current it produces in the load circuit of the transducer stator, gives a measure of the excitation current of the synchronous generator 1.

It is preferable that the induction current transducer should use an unsaturable magnetic circuit so as to ensure a linear relation between the e.m.f. in the stator winding and the excitation current, and also with a load impedance which is not greater than one-third of the reactance of the current transducer, so as to minimize the frequency and temperature errors of the transducer. For the same purpose, it is preferable that the measured variable should be the current of the transducer stator, either alternating or rectified.

The induction current transducer disclosed herein may be used on high- and superhigh-power turboalternators with brushless excitation, for which improvement in construction and a reduction in longitudinal dimensions are major problems.

What is claimed is:

1. In a synchronous generator system including a synchronous generator and an exciter and having a coupling electrically and mechanically interconnecting the rotor shafts thereof; an induction transducer for the excitation current of said synchronous generator, said transducer comprising a split stator having a ring winding and a rotor having a field winding which uses the conductors from said exciter to said synchronous generator, said shaft coupling forming the rotor of said induction transducer, said transducer field winding being supported in said coupling, and said transducer stator peripherally encompassing said rotor and coupling.

2. An induction current transducer, as claimed in claim 1, in which the stator is of split construction.

3. An induction current transducer, as claimed in claim 2, in which the stator uses a ring winding.

* * * * *